United States Patent [19]
Shambeau et al.

[11] Patent Number: 6,048,018
[45] Date of Patent: Apr. 11, 2000

[54] CARGO BOX SIDEWALL LATCH

[75] Inventors: Thomas Allan Shambeau, Beaver Dam, Wis.; Loren Fredrick Hansen, Lincoln, Nebr.

[73] Assignee: Deere & Company, Moline, Ill.

[21] Appl. No.: 09/292,489

[22] Filed: Apr. 15, 1999

[51] Int. Cl.[7] .................................................. B62D 33/03
[52] U.S. Cl. ........................ 296/57.1; 296/36; 296/26.03; 296/26.15
[58] Field of Search .............................. 296/50, 57.1, 60, 296/59, 58, 36, 10, 14, 7, 26.03, 26.11, 26.15; 49/503, 394, 213, 222; 292/DIG. 17, 269, 273; 16/357, 361, 363

[56] References Cited

U.S. PATENT DOCUMENTS

| D. 311,856 | 11/1990 | Tousaw | D8/331 |
|---|---|---|---|
| 1,122,849 | 12/1914 | Botteese | 296/36 |
| 1,636,468 | 7/1927 | Ferris | 292/273 |
| 2,278,450 | 4/1942 | Jones | 296/24.1 |
| 4,143,904 | 3/1979 | Cooper et al. | 296/57.1 |
| 4,348,045 | 9/1982 | Hori et al. | 296/14 |
| 4,580,828 | 4/1986 | Jones | 296/57.1 |

OTHER PUBLICATIONS

John Deere, 1800 Utility Vehicle brochure, 3 pages, published Jan. 1998 in U.S.A.
Kawasaki Motors Corp, Mule Accessories Catalog, 8 pages, publication date unknown, published in U.S.A.
John Deere, Military Gator Utility Vehicle brochure, 2 pages, published Mar. 1998 in U.S.A.
John Deere, Gator Utility Vehicles brochure, 8 pages, published Jan. 1998 in U.S.A.
Yanmar brochure, 4 pages, publication date and country unknown.
Daihatsu America, Inc., Hijet Multipurpose Off–Road Utility Vehicle Daihatsu, publication date and country unknown.

*Primary Examiner*—D. Glenn Dayoan
*Assistant Examiner*—Patricia L. Engle

[57] ABSTRACT

A convertible cargo box for transporting cargo on a vehicle is provided with first and second opposite side walls pivotably mounted about generally horizontal axes located adjacent the floor. The first and second side walls are each pivotable between a closed position generally perpendicular to the floor and an open position generally parallel to and aligned with floor to form an extension thereof. A sidewall support assembly is provided for releasably latching one of the first and second side walls in its open and closed positions. The sidewall support assembly includes a slide latch having a first end pivotably mounted to the one of the first and second side walls. The slide latch has an elongated slot with a stop corresponding to the open position of the one of the side walls. A slot follower is fixed between the first and second opposite side walls and slidably captured in the slot. The slot follower is engageable with the stop for preventing further pivoting of the one of the first and second side walls past its open position when the slot follower engages the stop.

12 Claims, 8 Drawing Sheets

CARGO BOX SIDEWALL LATCH

BACKGROUND OF THE INVENTION

1. Field of the Invention

The present invention relates to utility hauling vehicles and more particularly relates to latches and supports for sidewalls of cargo boxes of such vehicles.

2. Description of Related Art

Various hauling vehicle tailgate designs are known which include a cargo box having side walls and a tailgate which forms a rear wall thereof, the tailgate being mounted for pivoting about a horizontal axis at its bottom end between raised closed and lowered open positions. At least one such utility vehicle has sidewalls which also may be pivoted about a horizontal axis. Typically, a latch is provided at each upper corner of the tailgate for retaining the tailgate in its closed position and a flexible element, such as a cable, is provided which extends between each upper corner and the upper rear portion of each sidewall of the box for retaining the tailgate in an open position wherein it forms a horizontal extension of the bed or floor of the box.

These known tailgate latches and supports include many parts which, in most cases are either not designed or are not tight enough to keep the tailgate from rattling while the vehicle is operated with the tailgate open. For example, flexible cables suspend the tailgate but don't provide support against upward pivoting. Therefore, the tailgate (and cargo resting on the tailgate) may flop up and down as the vehicle travels across uneven terrain.

At least one such utility vehicle has sidewalls which also may be pivoted about a horizontal axis. The vehicle includes a complex system of pins, slots and slides used to hold the tailgate and sidewalls in a generally horizontal position. Such a system represents a relatively large cost to manufacture and maintain. Also, conversions from cargo box to flat bed, and vice versa, require substantial time and effort. In addition, the sliding movement of components requires a relatively precise alignment between parts. The relative sliding encourages wear of painted surfaces, which promotes rust. Dents in components or a moderate amount of dirt and debris may further hinder efficient operation.

U.S. Pat. No. 2,278,450, the disclosure of which is hereby incorporated by reference, discloses a military vehicle body which includes various shiftable panels which may be arranged to assume different positions in order to adapt the vehicle for various uses, including a cargo truck, a personnel carrier, and an emergency ambulance. A plurality of side panels are arranged to hinge downwardly and outwardly to extend the width of the floor. The lower surfaces of the side panels are arranged to rest against upper surfaces of hand grips which are provided on the outer surface of the vehicle body. The hand grips are permanent protrusions which extend the effective width of cargo box even where side panels not extended outwardly. Also, lowering the side panels to rest on the hand grips does not create a flat bed, since panels above wheel wells are higher than others. In addition, the panels are not secured and can flop up and down.

SUMMARY OF THE INVENTION

It is therefore an object of the invention is to provide a cargo box having a sidewall latch assembly which overcomes the disadvantages of the prior art structures.

It is another object of the invention to provide a sidewall latch assembly which will provide support of the sidewalls in their open positions where the tailgate is also open.

It is also an object of the invention to provide a sidewall latch assembly which is reliable and inexpensive to manufacture.

A further object of the invention is to provide a sidewall latch and support assembly which will function well in dirty environments.

According to the invention these and other objects are attained by providing a sidewall support assembly for a cargo box comprised of a floor, a tailgate and pivotable opposite side walls. The sidewall assembly includes a latch plate pivotably mounted at one end to the one of the side walls. The latch has an elongated slot with a stop corresponding to the open position of the side wall, and slot follower is fixed between the side walls (preferably to a front wall of the cargo box) and slidably captured in the slot, engageable with the stop for preventing further pivoting of the side wall past its open position.

In a preferred embodiment of the side wall support assembly, the slot includes detents corresponding to open and closed positions of the side wall. A spring is also provided for biasing the slot follower into the detent so that the weight of the sidewall and the force of the spring combine to automatically seat the slot follower into a detent corresponding to either its open or closed position to secure the sidewall in that position against up or down pivoting movement Other objects and advantages of the present invention will be apparent upon reading the following detailed description and accompanying drawings.

DESCRIPTION OF THE EXEMPLARY EMBODIMENT

Figure 1:
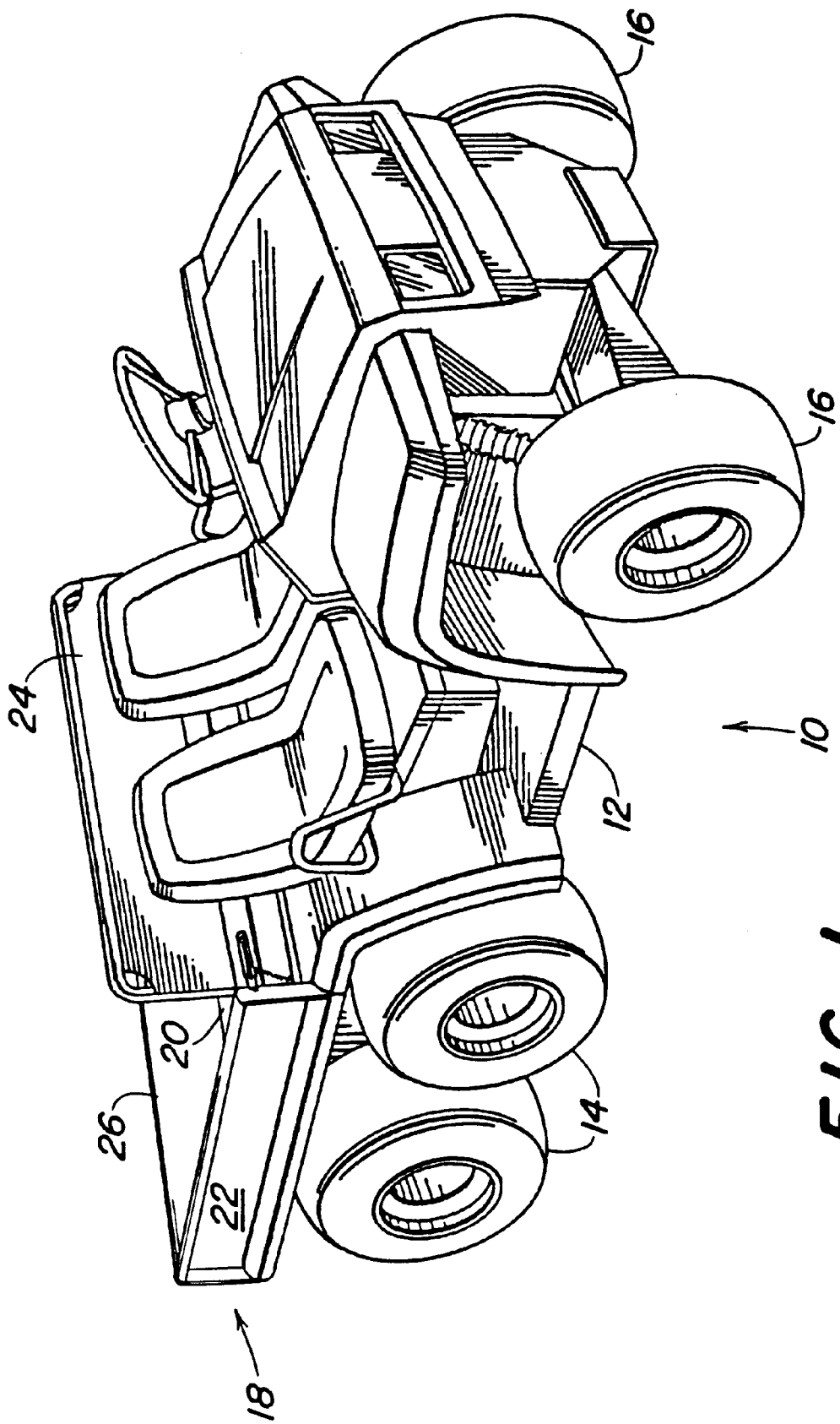
FIG. 1 is a right front perspective view of a utility hauling vehicle of the type with which the present invention is particularly adapted for use.

FIG. 1 shows a utility hauling vehicle 10 including a frame 12 supported by four drive wheels 14 (two of which are shown in FIG. 1) and a pair of steerable front wheels 16. Supported on the frame 12 in a location above the drive wheels 14 is a cargo box 18. The box 18 includes a horizontal bed or floor 20 and vertical right and left sidewalls 22, a front wall 24 and a tailgate 26. The tailgate 26 forms a rear wall of the box 18 and is mounted, in a manner to be described, for selectively closing the opening defined by the rear edges of the floor 20 the sidewalls 22. The sidewalls 22 are also mounted, in a manner to be described, for pivoting about fore and aft extending horizontal axes. In this manner, the sidewalls 22 and the tailgate 26 may be pivoted from closed, upright positions to open, recumbent positions wherein they effectively become extensions of the floor 20 and the cargo box 18 may be thereby converted to a flat bed (as may be seen in FIG. 3).

Figure 2:
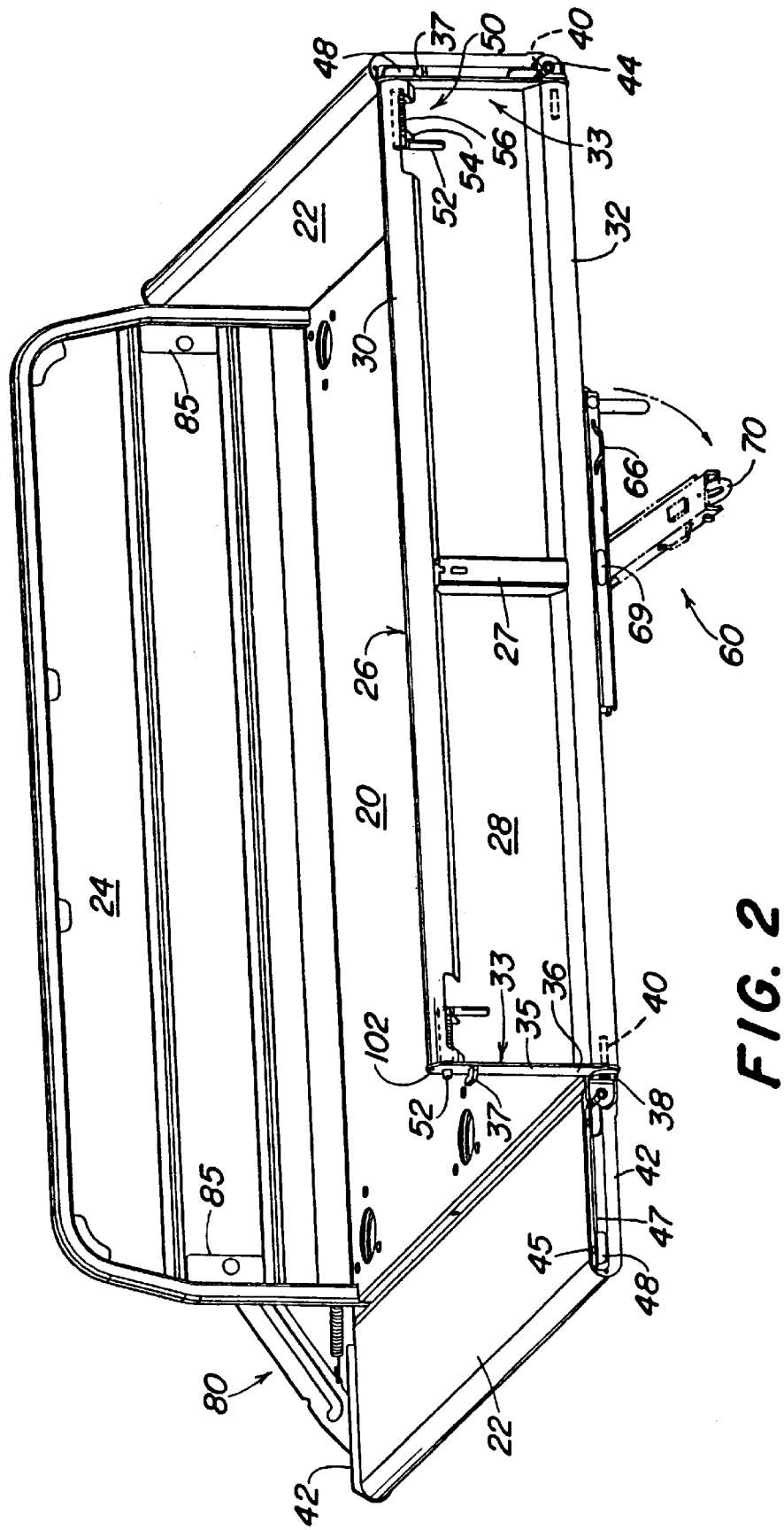
FIG. 2 is a left rear perspective view of the cargo box of the utility vehicle of FIG. 1 wherein one of the side walls is shown in its open, recumbent position.

Referring now to FIG. 2, the tailgate 26 as considered in its upright position includes an upright panel 28 having a rolled upper edge 30 and a rolled bottom edge 32. A latch section 27 in the form of an open-ended U-channel is welded to the upright panel 28. Opposite ends 33 of the tailgate 26 are each defined by a tailgate end plate 35 having a main straight portion 36 and a sidewall retaining tab 37. A tailgate bracket 38 is fixed to the floor 20 and receives a pivot pin 40, which further extends through a hole in the tailgate end plate 35. The pivot pin 40 is retained by threaded engagement with a nut welded to an interior side of the end plate 35 and abutment of the head of the pivot pin 40 with the bracket 38. The pivot pins 40 at each end of the tailgate 26 represent a generally horizontal axis about which the tailgate 26 may pivot. The tailgate 26 also includes a latching structure 50 at each end 33 including an L-shaped rod 52, which is guided for axial movement by confinement within a hole in a bracket 54 fixed to and extending rearwardly from the upright panel 28, a bushing welded to the inside of the end plate 35 and an aligned hole in the tailgate end plate 35. A spring 56 is captured between the bracket 54 and a pin extending through a crossbore in the rod 52 such that the rod 52 is biased towards a position wherein an end of the rod 52 extends outwardly beyond the tailgate end plate 35.

Figure 3:
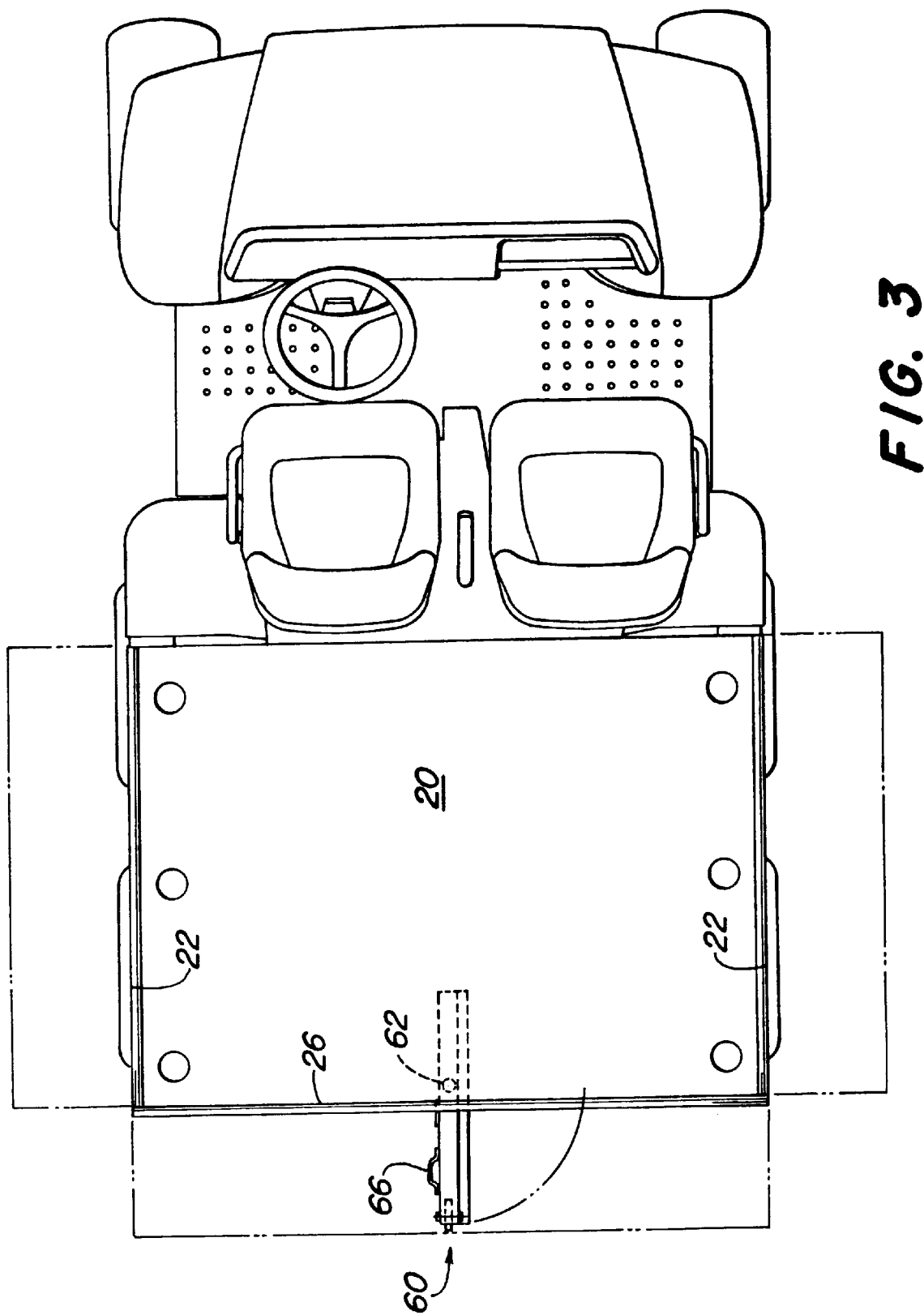
FIG. 3 is a plan view of the utility vehicle of FIG. 1 showing the side walls and tailgate in solid lines in their closed, upright positions and showing the side walls and tailgate in dashed lines in their open, recumbent positions.

As shown in FIGS. 2–6, A swing arm 60 is mounted to the frame 12 of the vehicle 10 under the floor 20. The swing arm 60 is fixed to the frame by a bolt 62 at a bracket 63 so that the swing arm 60 may pivot about a generally vertical axis between a stored position wherein the swing arm 60 extends laterally and is disposed beneath the floor 20, and a support position wherein the swing arm 60 extends longitudinally and a latching section 64 extends rearwardly past the tailgate 26 as considered in its closed position. FIG. 3 shows the swing arm 60 in its support position and the relative positions of the tailgate 26 and sidewalls 22 in their closed and open (represented by dashed lines) positions. Preferably, the swing arm 60 is provided with a handle 66 which an operator may grasp to rotate the swing arm 60 between its stored and support positions The bracket 63 includes a rotation stop 68 which provides interference with the swing arm 60 at both the stored and support positions of the swing arm 60 so that the operator may easily move the swing arm 60 between these positions.

Because a rear elongated side 101 of the swing arm 60 may be even or nearly even with the rear end of the vehicle 10 when the swing arm 60 is in its stored position, the tailgate 26 may come into contact with the swing arm 60 when the tailgate 26 is pivoted downwardly to a vertical position or beyond (past its open position where it may be supported by the swing arm 60). Therefore, it may be desirable to include a rubber pad 69 on the side 101 to absorb shock and reduce noise that would otherwise result from the tailgate 26 hitting the swing arm 60 (especially where both are metallic). In such a case it would be desirable to ensure that the distance the handle 66 extends from the swing arm 60 is less than the distance the latch section 27 extends from the upright panel 28 so that first contact between the tailgate 26 and the swing arm 60 will be made between the rubber pad 69 and the latch section 27 rather than the handle 66 and the upright panel 28.

A latch hook 70 is mounted at a distal end 72 of the swing arm 60 by a bolt 74, which serves as an axis of rotation for the hook 70. The latch hook 70 is welded to a bushing 71 which surrounds the bolt 74 so that the hook 70 is retained at its desired position on the bolt 74. Nylon washers 73 are provided at each end of the bushing 71 to provide friction necessary to load the bushing 71 to require a desired amount of force to rotate the hook 70. A handle 78 extends from the hook 70 so that an operator may more easily rotate the hook 70 to latch the tailgate 26 in its open position. A support bracket 75 is mounted to a cargo box frame rail 15 adjacent a proximal end 77 of the swing arm 60 when the swing arm 60 is in its support position (FIG. 5) to provide support for the proximal end 77 of the swing arm 60 in order to reduce the bending moment seen by the bolt 62 when the swing arm 60 is loaded at its distal end 72 by the tailgate 26.

Figure 7:
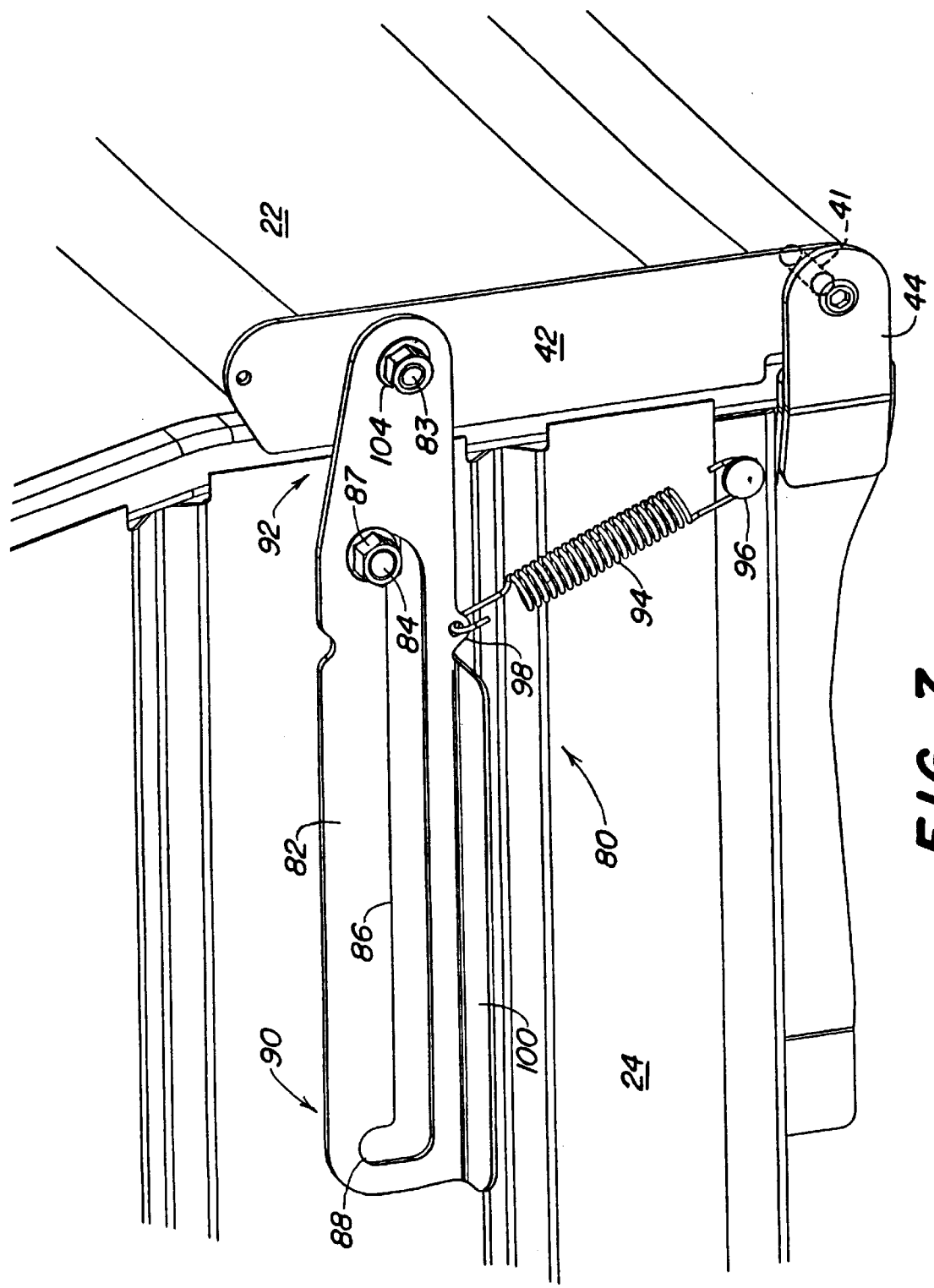
FIG. 7 is an enlarged partial left front perspective view of the cargo box of FIG. 1 showing a front latch retaining the side wall in its closed, upright position.
Figure 8:
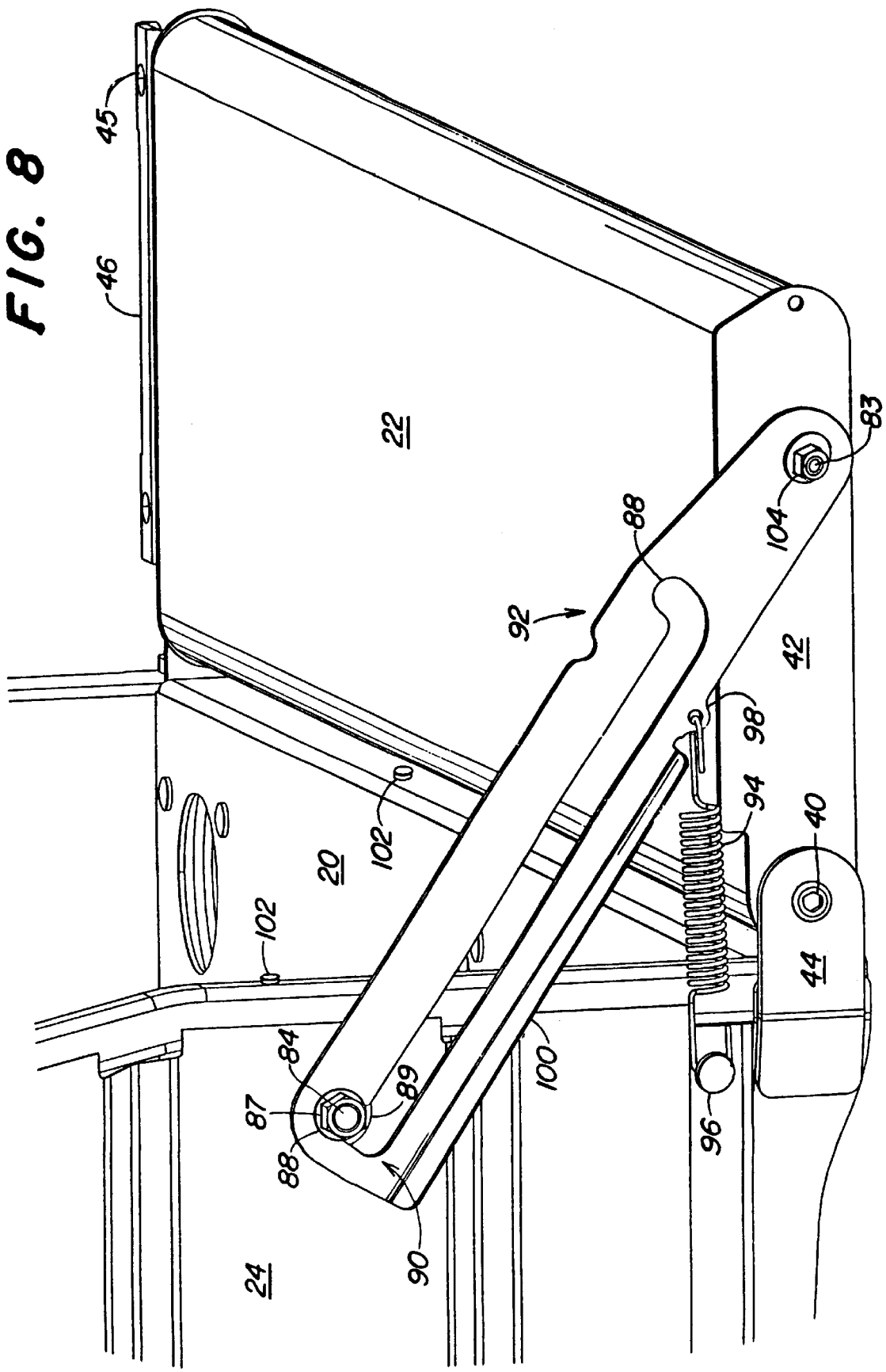
FIG. 8 is an enlarged partial left front perspective view of the cargo box of FIG. 7 showing the front latch retaining the side wall in its open, recumbent position.

Looking now to FIGS. 7 and 8, it will be seen that the sidewalls 22 each have, at opposite front and rear ends, sidewall end plates 42 which include holes for receiving pivot pins 41 which are also received by sidewall mounting brackets 44 which are fixed with respect to the floor 20. The pivot pins 41 are retained in position as the pivot pins 40 used for the tailgate 26 by threaded engagement with welded nuts. The pivot pins 41 at each end of the sidewalls 22 similarly represent a pair of transversely spaced apart and generally horizontal axes about which the sidewalls 22 may pivot. The sidewall end plates 42 at the rear ends of the sidewalls 22 each include a retaining flange 46 welded thereto. As seen in FIG. 2, the retaining flange 46 includes a main portion 47 which extends rearwardly from end plate 42 of the sidewall 22 and bent portions 48 extending rearwardly and outwardly from the main portion 47. The retaining flange is provided with a hole 45 for a purpose to be described.

Figure 4:
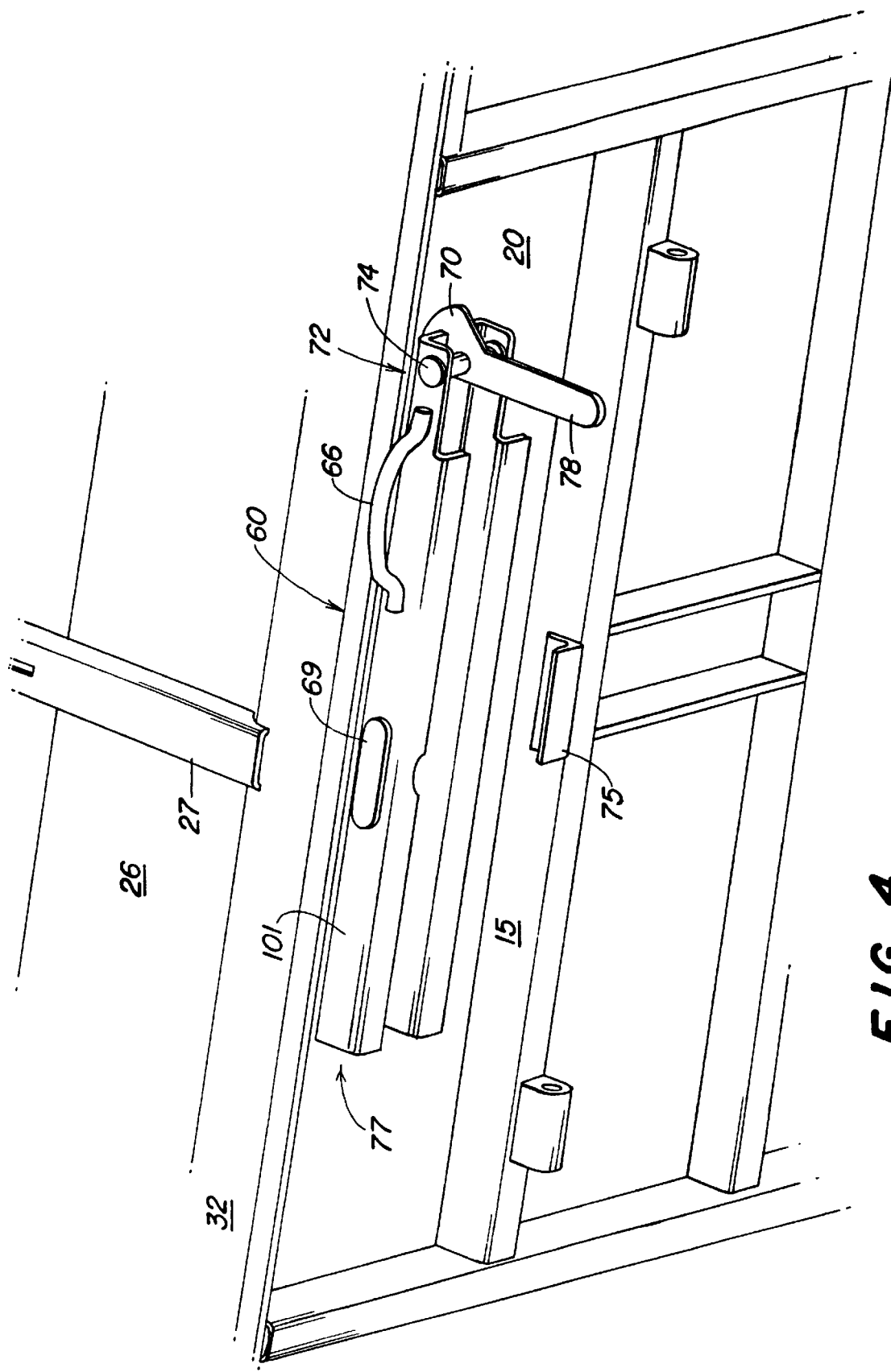
FIG. 4 is a bottom rear view of the cargo box of FIG. 2 showing a tailgate support arm in its stored position and the tailgate in its closed, upright position.
Figure 5:
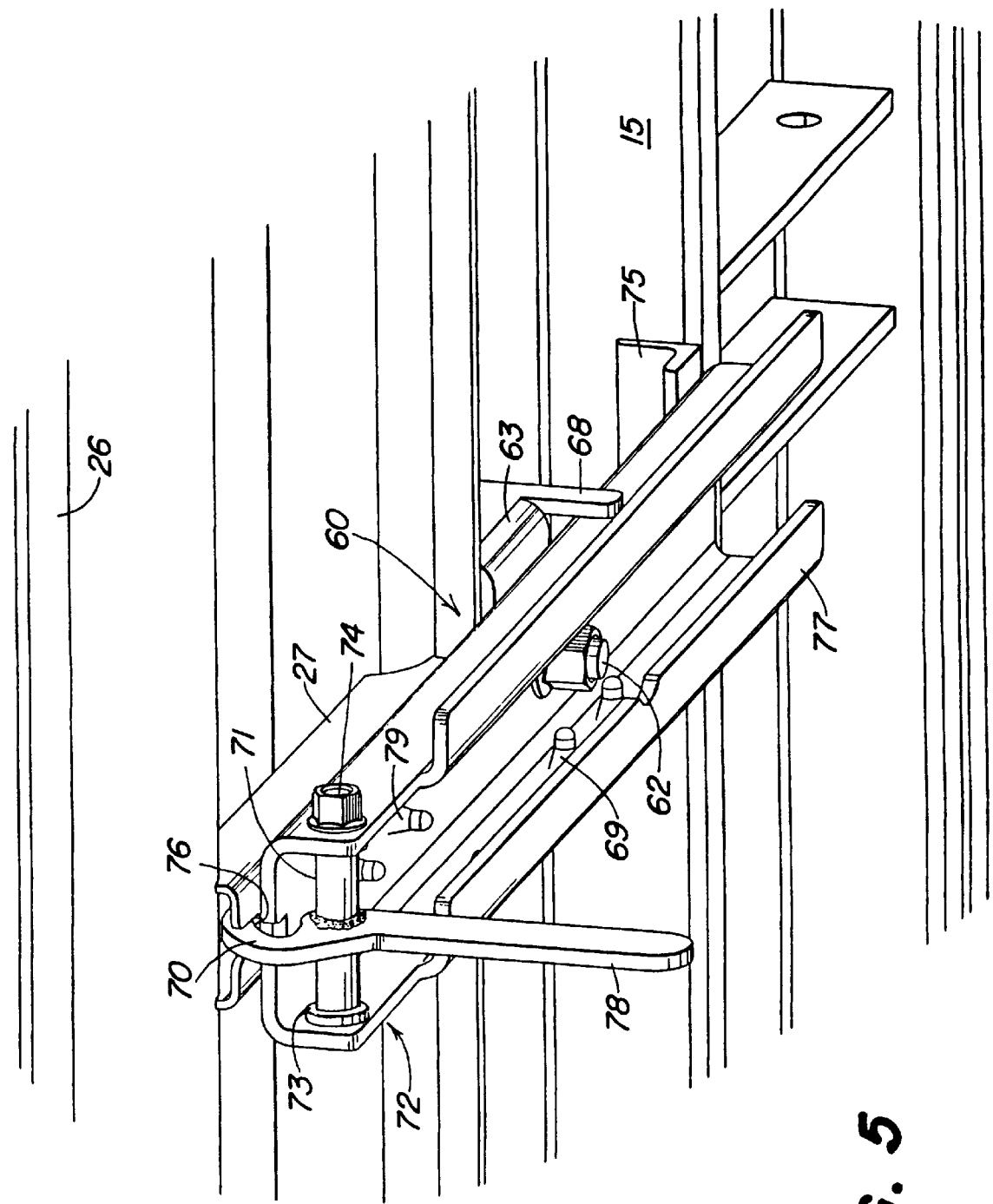
FIG. 5 is a bottom rear view of the cargo box of FIGS. 2 and 4 showing the tailgate support arm in its support position and latching the tailgate in its open, recumbent position.
Figure 6:
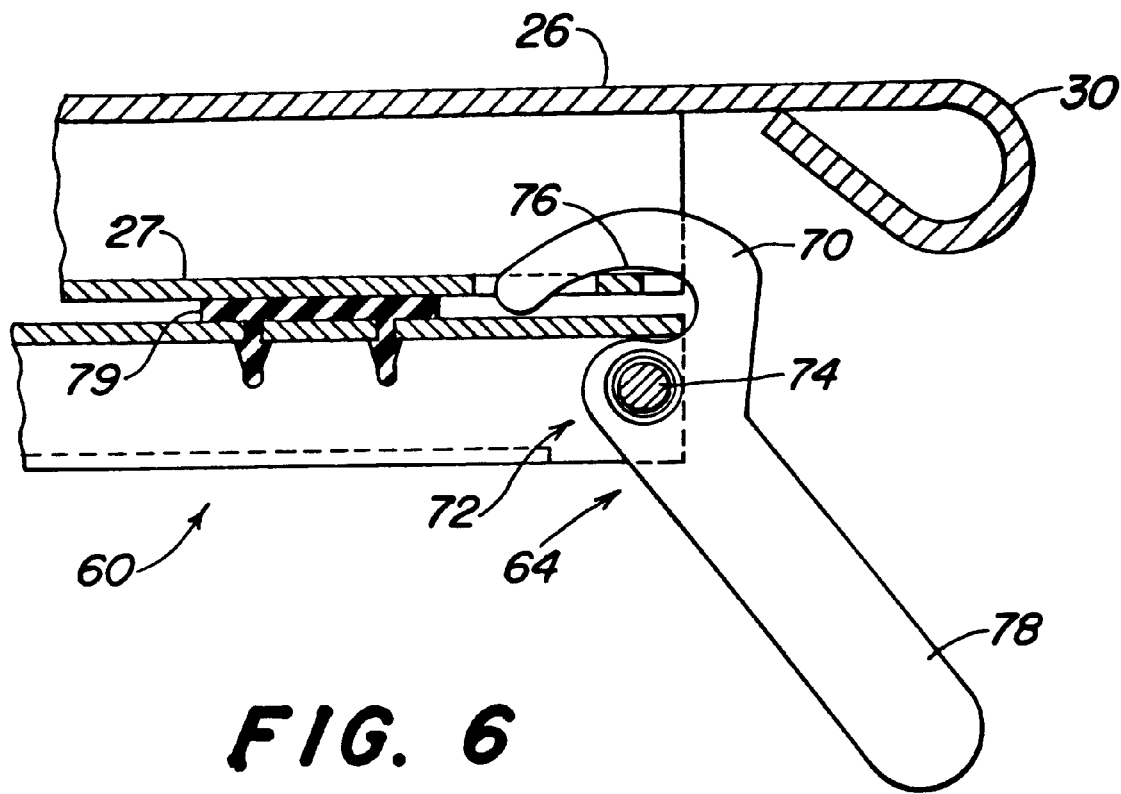
FIG. 6 is a cross-sectional view of the tailgate support arm and tailgate or FIG. 5.

Referring now to FIGS. 2, 4, and 5, it will be seen that when it is desirable to open the tailgate 26 and to latch the tailgate 26 in its open position, the swing arm 60 is rotated from its stored position (FIG. 4) to its support position (FIG. 5) so that it extends rearwardly beyond the tailgate 26 as considered in its closed position. To release the latching structure 50, the L-shaped rods 52 may be slid inward (against the force of the spring) so that the ends of the rods 52 are removed from engagement with holes in the sidewall retaining flanges 46. The tailgate 26 may then be pivoted downwardly. Referring now to FIGS. 5–6, when the tailgate 26 achieves a generally horizontal orientation (its open position), the latch section 27 will be in abutting relationship with the top of the swing arm 60. It may therefore be seen that the latch section 27 represents the surface of the tailgate 26 which is directly supported on the swing arm 60. The latch section 27 extends from the upright panel 28 of the tailgate 26 to ensure that the tailgate 26 is aligned with the floor 20 to form an extension thereof when the tailgate 26 is in its open position and supported by the swing arm 60. The tailgate 26 may then be locked in its open position by movement of the handle 78, effecting rotation of the hook 70 into the open end of the latch section 27. The hook 70 then captures the bottom side of the latch section 27. An interior contour 76 of the hook 70 is not a constant radius about the bolt 74, so that the hook 70 acts as a cam, clamping the tailgate 26 (via its latch section 27) and the swing arm 60 together with increasing force as the hook 70 is rotated. To unlatch the hook, 70, it may be rotated through an opening in the latch section 27 and back against the top of the swing arm 60 (shown in FIG. 6). Preferably, a snubber 79, configured of a resilient material such as rubber, is provided between the latch section 27 and the swing arm 60 (shown here fixed to the top of the swing arm 60) to reduce vibration and help prevent rattling of the connection (representing noise and instability of the connection) between the tailgate 26 and the swing arm 60 while the vehicle 10 moves over uneven terrain.

To close the tailgate 26, the tailgate 26 is disengaged from the swing arm 60 by rotation of the hook 70. As seen in the right hand side of FIG. 2, the tailgate 26 can then be pivoted upwardly until the L-shaped rods 52 extending therefrom are in an abutting relationship with the bent portions 48 of the sidewall retaining flanges 46. Further movement of the tailgate 26 causes the rods 52 to be slid inwardly by the bent portions 48 of the sidewall retaining flanges 46 and to be resiliently loaded as the spring 56 is compressed. When the tailgate reaches its closed, upright position, the rods 52 are aligned with the corresponding holes 45 in the sides of the flanges 46. The L-shaped rods 52 are biased by the force of the spring 56, so that ends of the rods 52 are positioned in each of the holes 45 in the retaining flanges 46, preventing further pivoting movement of the tailgate 26. At the same time, an inward extension of the sidewall retaining tab 37 will trap the main portion 47 of the retaining flange 46 so that the sidewall 22 cannot pivot outwardly. Abutment of the interior of the sidewall 22 against the tailgate 26 and front wall 24, as well as a front latch assembly 80, prevent the sidewall 22 from pivoting inwardly. It may therefore be seen that when the sidewalls 22 and tailgate 26 are in their closed, upright positions, they engage each other for mutual support. When the tailgate 26 is closed, the swing arm 60 should be rotated into its stored position.

The sidewalls 22 are supported and held in their open and closed positions by a front latch assembly 80 at the front end of each sidewall 22 (See FIGS. 7–8). The front latch assembly 80 for the left-hand sidewall 22 is shown in FIGS. 7–8. The front latch assembly 80 for the right-hand sidewall 22 is a mirror image. The front latch assemblies 80 each include a latch plate 82 which is pivotably secured at one end to the sidewall end plate 42 by a bolt 83 and nut 104. The bolt 83 is surrounded by a bushing which allows force to be transmitted between the nut 104 and the sidewall end plate 42 so that a tight connection may be maintained without inhibiting pivotal movement of the latch plate 82 about the bolt 83. A bolt 84 is mounted through an opening in the front wall 24 (and a corresponding opening in a strengthening plate 85 shown in FIG. 2 to effectively increase the gauge of the front wall 24). The bolt 84 and a bushing surrounding the bolt 84 are captured in a slot 86 in the latch plate 82 by a flanged nut 87 so that the latch plate 82 may slide with respect to the bolt 84 and the bolt 84 effectively follows the slot. It may be desirable to provide the bolt 84 with one or more washers 89 to act as bearing surfaces for the latch plate 82. The washers 89 serve to space the latch plate 82 from the front wall 24 to keep the latch plate 82 generally parallel to the front wall 24, since the sidewall end plate 42 is preferably designed to overlap the front wall 24 to provide added strength to the cargo box 18 when the sidewalls 22 are in their closed, upright positions. The washers 89 may be constructed of a low friction material so that the relative sliding between the bolt 84 and the latch plate 82 will require less effort. The slot 86 includes upturned portions 88 at inboard and outboard ends 90, 92 of the slot 86 which serve as detents, each corresponding to one of the open and closed positions of the sidewall 22. Preferably, the openings in the front wall 24 and the strengthening plate 85 are oblong so that the bolt 84 may be adjusted account for manufacturing tolerances in associated parts. The bolt 84 may be loosened, the sidewall 22 brought up tight against the outside of the front wall 24, and the bolt 84 re-tightened. This adjustment assures that the closed, upright position of the sidewall 22 correlates to a desired relationship between the sidewall 22 and the front wall 24.

A spring 94 is connected between a spring post such as a rivet 96 shown fixed to the front wall 24 and a tab portion 98 of the latch plate 82. The spring 94 biases the latch plate 82 downwardly so that, absent countervailing force applied by an operator, the bolt 84 will be seated within one of the upturned portions 88 and the sidewall 22 will be retained in the open or closed position corresponding to the particular upturned portion 88 in which the bolt 84 is seated. The latch plate 82 is shown having an outturned lip 100 so that an operator may more easily grasp the latch plate 82 to lift the latch plate 82 against the bias of the spring 94.

FIG. 7 shows the front latch assembly 80 associated with the left-hand sidewall 22 of the vehicle 10 where the sidewall 22 is shown in its closed position. The bolt 84 is seated in the upturned portion 88 of the slot 86 at the outboard end 92 of the slot 86, preventing pivoting of the sidewall 22.

An operator may open the sidewall 22 (when the tailgate 26 is in its open position) by lifting the latch plate 82 to overcome the force of the spring 94 and disengage the bolt 84 from the upturned portion 88 so that the latch plate 82 may travel the length of its slot 86 as the sidewall 22 pivots downwardly. When the sidewall 22 reaches its open position (shown in FIG. 8), the bolt 84 encounters the inboard end 90 of the slot 86, where the force of the spring 94 again biases the plate 82 downward so that the bolt is 84 captured in the upturned portion 88 at the inboard end 90 of the slot 86.

The sidewall 22 may be closed by lifting the latch plate 82 to unseat the bolt 84 from the upturned portion 88 at the inboard end 90 of the slot 86. The sidewall 22 may then be pivoted upwardly until the sidewall 22 reaches its closed position, where the bolt 84 encounters the outboard end 92 of the slot 86. The spring 94 will then pull the latch plate 82 downward so that the bolt 84 is seated in the upturned portion 88 at the outboard end 92 of the slot 86.

To convert the cargo box 18 into a flat bed (FIG. 2), the swing arm is rotated to its support position and the tailgate is opened in the manner set forth above and latched in its open position to the swing arm. The front latch assemblies 80 may then be manipulated as previously described so that the sidewalls 22 may be pivoted to their open positions, thereby completing the conversion. The cargo box 18 may be re-formed by first closing the sidewalls 22 and then the tailgate 26 in the manner herein described. It may be desirable to provide buffers such as nylon pads 102 around the periphery of the floor 20 and between the sidewalls 22 and the tailgate 26 and the front wall 24. The pads 102 serve to reduce noise when the sidewalls 22 and tailgate 26 are in their closed, upright positions.

Although the invention is described with reference to an illustrative embodiment, it will be understood by those skilled in the art that the invention may be advantageous in the form described as modified for use in other applications. For example, the slot in the latch plate may be configured as various other types of tracks such as a pair of raised rails and the slot follower may be configured as a roller or other track follower. The present invention should not be limited by the above-described embodiments, but should be limited solely by the claims that follow.

We claim:

1. A convertible cargo box for transporting cargo on a vehicle having a frame supporting the cargo box, said cargo box comprising:

a floor having a front side;

an upstanding wall member carried on the frame adjacent the front side of the floor;

a side wall member carried on the frame and pivotably mounted to swing about a generally horizontal axis located adjacent the floor;

said side wall member being pivotable between a closed position generally perpendicular to the floor and an open position generally parallel to and aligned with the floor to form an extension thereof; and a sidewall member support assembly for releasably latching the side wall member in its open and closed positions, said assembly comprising a slide latch having a first end pivotably mounted to one of the upstanding and side wall members, said latch having an elongated track with a stop corresponding to the open position of the side wall member, and a track follower fixed to the other of the upstanding and side wall members and slidably captured in the track and engageable with the stop for preventing further pivoting of the side wall member past its open position when the track follower engages the stop.

2. The cargo box of claim 1 wherein the track is configured as an elongated slot and the track follower is configured as a slot follower.

3. The cargo box of claim 2 wherein first and second stops of the elongated slot are formed by first and second detents at opposite ends of the slot, each of said detents corresponding to position of the slide latch when the side wall member is in one of its open and closed positions.

4. The cargo box of claim 3 additionally comprising a spring connecting the slide latch to a spring post mounted to the upstanding wall member for biasing the slot follower into one of the first and second detents for locking the side wall member into one of its open and closed positions.

5. The cargo box of claim 1 wherein the slide latch is configured as a plate.

6. The cargo box of claim 5 wherein the slide latch has a outturned portion extending generally perpendicularly therefrom.

7. A convertible cargo box for transporting cargo on a vehicle, said cargo box comprising:

a floor;

a tailgate pivotably mounted about a generally horizontal axis located adjacent the floor;

first and second opposite side walls, each of said first and second side walls pivotably mounted about a generally horizontal axis located adjacent the floor and separated by the tailgate;

said first and second side walls each pivotable between a closed position generally perpendicular to the floor and an open position generally parallel to and aligned with floor to form an extension thereof; and a sidewall support assembly for releasably latching one of the first and second side walls in its open and closed positions, said assembly comprising a slide latch having a first end pivotably mounted to the one of the first and second side walls, said latch having an elongated slot with a stop corresponding to the open position of the one of the side walls, and a slot follower fixed between the first and second opposite side walls and slidably captured in the slot engageable with the stop for preventing further pivoting of the one of the first and second side walls past its open position when the slot follower engages the stop.

8. The cargo box of claim 7 wherein first and second stops of the elongated slot are formed by first and second detents at opposite ends of the slot, each of said detents corresponding to position of the slide latch when the one of the first and second side walls is in one of its open and closed positions.

9. The cargo box of claim 8 additionally comprising a spring connecting the slide latch to a spring post fixed between the first and second side walls for biasing the slot follower into one of the first and second detents for locking the one of the first and second side walls into one of its open and closed positions.

10. The cargo box of claim 7 additionally comprising a front wall disposed closely adjacent the floor opposite the tailgate and extending generally perpendicular thereto, said slot follower being fixed to the front wall.

11. The cargo box of claim 7 wherein the slide latch is configured as a plate.

12. The cargo box of claim 11 wherein the slide latch has a outturned portion extending generally perpendicularly therefrom.

* * * * *